(12) United States Patent
Komuro

(10) Patent No.: US 8,087,237 B2
(45) Date of Patent: Jan. 3, 2012

(54) SECONDARY-AIR SUPPLY SYSTEM FOR INTERNAL COMBUSTION ENGINE

(75) Inventor: Hidefumi Komuro, Setagaya-ku (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 623 days.

(21) Appl. No.: 12/235,794

(22) Filed: Sep. 23, 2008

(65) Prior Publication Data

US 2009/0077952 A1    Mar. 26, 2009

(30) Foreign Application Priority Data

Sep. 26, 2007   (JP) ................................ 2007-249163

(51) Int. Cl.
*F01N 3/00* (2006.01)
(52) U.S. Cl. ................. 60/289; 60/304; 60/305; 60/306
(58) Field of Classification Search .................... 60/289, 60/293, 299, 304
See application file for complete search history.

(56) References Cited

U.S. PATENT DOCUMENTS

| | | | |
|---|---|---|---|
| 4,103,488 A | 8/1978 | Aoyama | |
| 4,180,975 A | 1/1980 | Takagi et al. | |
| 4,183,212 A | 1/1980 | Takagi | |
| 7,114,326 B2 * | 10/2006 | Mukaihira et al. | ............... 60/277 |
| 2002/0144500 A1 * | 10/2002 | Nakata | ............................ 60/277 |
| 2004/0244364 A1 * | 12/2004 | Makki et al. | ..................... 60/285 |
| 2006/0048504 A1 * | 3/2006 | Oi et al. | ........................... 60/289 |
| 2010/0000204 A1 * | 1/2010 | Hemsley | ......................... 60/317 |

FOREIGN PATENT DOCUMENTS

| | | |
|---|---|---|
| DE | 41 06 249 A1 | 9/1991 |
| JP | 55-012202 | 1/1980 |
| JP | 08028253 A * | 1/1996 |
| JP | 09088563 A * | 3/1997 |
| JP | 09151727 A * | 6/1997 |
| JP | 2005-090396 | 4/2005 |

* cited by examiner

*Primary Examiner* — Thomas Denion
*Assistant Examiner* — Patrick Maines
(74) *Attorney, Agent, or Firm* — Drinker Biddle & Reath LLP

(57) ABSTRACT

A secondary-air supply system for an internal combustion engine, including a catalyst provided in an exhaust passage and configured to purify exhaust gas from the engine, and a secondary-air supply source and a secondary-air valve provided in a secondary-air passage connected upstream from the catalyst. A secondary-air supply device is configured to drive the secondary-air supply source and to open the secondary-air valve to supply secondary air to the exhaust passage upstream from the catalyst under a warm-up condition of the engine. Secondary-air supply control means is configured to control the secondary-air supply device to drive the secondary-air supply source and to open the secondary-air valve under a high-load operating condition where a flow rate of the exhaust gas is high, the high-load operating condition being different from the warm-up condition.

9 Claims, 4 Drawing Sheets

SECONDARY-AIR SUPPLY SYSTEM FOR INTERNAL COMBUSTION ENGINE

This application claims priority under 35 U.S.C. §119 to Japanese Patent Application No. 2007-249163, filed on Sep. 26, 2007, which is incorporated by reference herein in its entirety.

FIELD OF THE INVENTION

The present invention relates generally to a technique for preventing sticking and thermal degradation of a secondary-air valve that supplies secondary air to an exhaust system for an internal combustion engine.

BACKGROUND OF THE INVENTION

In an internal combustion engine under a predetermined warm-up condition, the air-fuel ratio is enriched, and unburned fuel is discharged to an exhaust passage and is burned by the supply of secondary air. This increases the exhaust-gas temperature, and promotes activation of an exhaust-gas purification catalyst.

The supply of secondary air is controlled by a secondary-air valve provided in a secondary-air passage extending from a secondary-air supply source. A related art system discloses a temperature-sensitive check valve provided in a secondary-air passage downstream from a secondary-air valve so as to prevent exhaust gas from flowing into the secondary-air valve during normal operation.

A secondary-air valve is used under a predetermined warm-up condition, and is kept close during normal operation. When the exhaust-gas flow rate increases, the secondary-air valve is exposed to high-temperature and high-pressure exhaust gas due to backflow of exhaust gas. As such, the secondary-air valve can stick due to adhesion of combustion residues and the like contained in the exhaust gas, and parts can degrade due to heat.

By providing the check valve downstream from the secondary-air valve, as in the related art, the exhaust gas can be prevented from flowing back into the secondary-air valve. However, since the check valve is located in a thermally stricter condition (at a position near the exhaust system), the danger of system failure resulting from the check valve sticking is increased. In other words, if sticking occurs in the check valve, then secondary air is not supplied when needed, which reduces exhaust-gas purification performance.

An object of the invention is to more reliably prevent sticking and thermal degradation of a secondary-air valve.

According to an aspect of the present invention, a secondary-air supply source is driven and a secondary-air valve is opened under a high-load operating condition where the flow rate of exhaust gas is high, unlike a warm-up condition.

According to the present invention, under a high-load operating condition where the flow rate of exhaust gas is high, the secondary-air supply source is driven and the secondary-air valve is opened so that secondary air flows. As a result, exhaust gas that would otherwise flow back to the secondary-air valve is stopped, and combustion residues are prevented from adhering to the secondary-air valve. Moreover, the secondary-air valve is cooled and thermal degradation is prevented.

SUMMARY OF THE INVENTION

In an embodiment, the invention provides a secondary-air supply system for an internal combustion engine, including a catalyst provided in an exhaust passage and configured to purify exhaust gas from the engine, and a secondary-air supply source and a secondary-air valve provided in a secondary-air passage connected upstream from the catalyst. A secondary-air supply device is configured to drive the secondary-air supply source and to open the secondary-air valve to supply secondary air to the exhaust passage upstream from the catalyst under a warm-up condition of the engine. Secondary-air supply control means is configured to control the secondary-air supply device to drive the secondary-air supply source and to open the secondary-air valve under a high-load operating condition where a flow rate of the exhaust gas is high, the high-load operating condition being different from the warm-up condition.

In another embodiment, the invention provides a method of supplying secondary air with a secondary-air supply system for an internal combustion engine. The secondary-air supply system includes a catalyst provided in an exhaust passage configured to purify exhaust gas from the engine, a secondary-air supply source and a secondary-air valve provided in a secondary-air passage connected upstream from the catalyst, a secondary-air supply device, and a secondary-air supply controller. The method includes driving the secondary-air supply source and opening the secondary-air valve with the secondary-air supply device to supply secondary air to the exhaust passage upstream from the catalyst under a warm-up condition of the engine, and controlling the secondary-air supply device with a secondary-air supply controller to drive the secondary-air supply source and to open the secondary-air valve under a high-load operating condition where a flow rate of the exhaust gas is high, the high-load operating condition being different from the warm-up condition.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
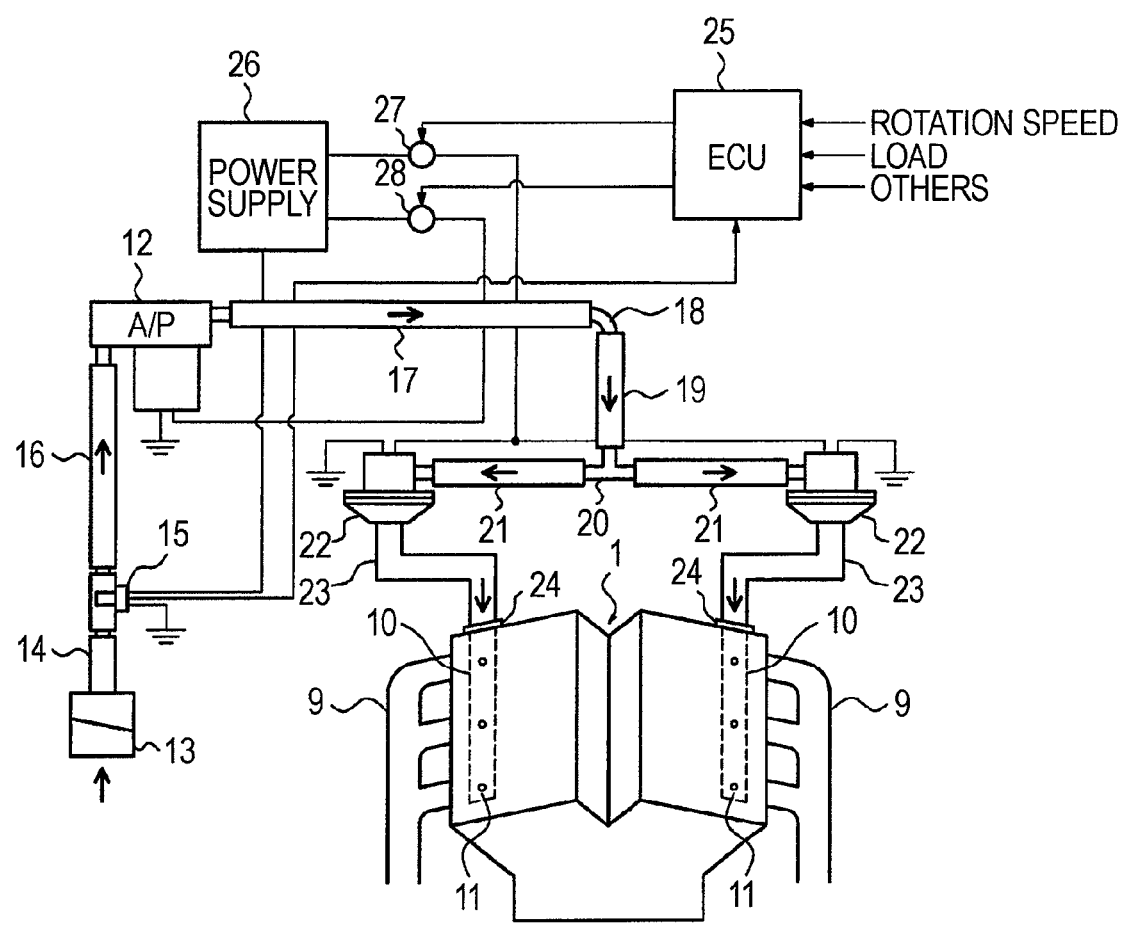
FIG. 1 is structural view of a secondary-air supply system for an internal combustion engine according to an embodiment of the present invention.

FIG. 1 is a structural view of a secondary-air supply system for an internal combustion engine according to an embodiment of the present invention. In this embodiment, an internal combustion engine 1 is a V-6 cylinder engine.

Figure 2:
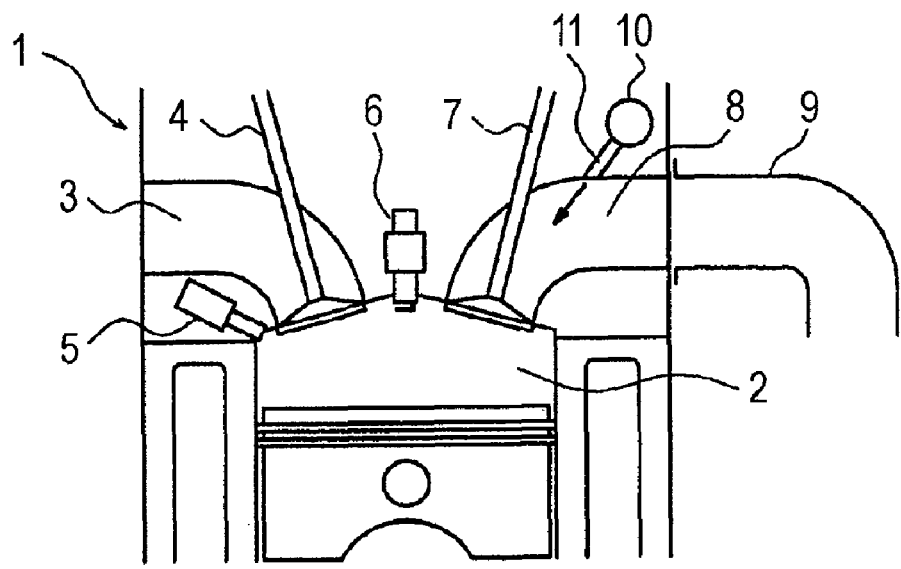
FIG. 2 is a cross-sectional view a combustion chamber and its surroundings in the internal combustion engine.

FIG. 2 is a cross-sectional view of a combustion chamber and its surroundings in each cylinder. In a combustion chamber 2 of each cylinder, air introduced from an intake port 3 via an intake valve 4 and fuel injected from a fuel injection valve 5 form an air-fuel mixture, and the air-fuel mixture is ignited and burned by an ignition plug 6. After burning, exhaust gas is discharged into an exhaust port 8 via an exhaust valve 7.

In each bank, an exhaust manifold 9 is provided so as to communicate with the exhaust ports 8 of the cylinders. An exhaust-gas purification catalyst (not shown) is provided downstream from a united portion of the exhaust manifold 9.

In each bank, a secondary-air gallery 10 extends through a cylinder head in the direction in which the cylinders are arranged. The secondary-air gallery 10 supplies secondary air to the upstream side of the catalyst in the exhaust passage, particularly into the exhaust port 8 of each cylinder in the cylinder head where the temperature of exhaust gas is high. Secondary-air discharging passages (discharging ports) 11 branch from the secondary-air gallery 10, and are open to the corresponding exhaust ports 8 of the cylinders. While secondary air is supplied to the exhaust ports 8 in this embodiment, it can be supplied to any portion provided upstream from the catalyst in the exhaust passage. Further, secondary air can be supplied to each cylinder or each cylinder group (bank), or can be commonly supplied to all cylinders.

As a secondary-air supply source, an electrically-operated air pump 12 is provided.

On an intake side of the air pump 12, a sub air cleaner 13, a hose 14, a sub air flow meter 15, and a hose 16 are arranged in that order from the upstream side. The sub air flow meter 15 is used to detect failure in the secondary-air supply system.

On an discharge side of the air pump 12, a hose 17, an elbow 18, a hose 19, a branch pipe 20, hoses 21, secondary-air valves 22, and pipes 23 are arranged in that order. The pipes 23 communicate with the secondary-air galleries (passages in the head) 10 via gaskets 24.

Each secondary-air valve 22 is electromagnetically driven, and the opening (flow rate) of the secondary-air valve 22 can be controlled by duty control.

An ECU (engine control unit) 25 receives information about the engine speed, load, etc., controls the fuel injection amount, injection time, and ignition time according to the information, and also controls the operations of the air pump 12 and the secondary-air valves 22. The supply of power from a power supply 26 to the air pump 12 is turned on and off by a switching element 28, and the supply of power from the power supply 26 to the secondary-air valves 22 is subjected to duty control by a switching element 27.

When there is a request to increase the temperature of the catalyst during a warm-up immediately after start-up, for example, when the temperature of the catalyst detected by a catalyst temperature sensor is lower than a predetermined activation temperature, the air-fuel ratio on the engine side is enriched, a large amount of unburned fuel is discharged to the exhaust ports 8, and the air pump 12 is turned on in this state. Moreover, the secondary-air valves 22 are opened so as to supply secondary air to the exhaust ports 8. In other words, the exhaust-gas temperature is increased and the catalyst is activated early by discharging a large amount of unburned fuel to the exhaust ports 8 and burning the unburned fuel by the supply of secondary air.

Figure 3:
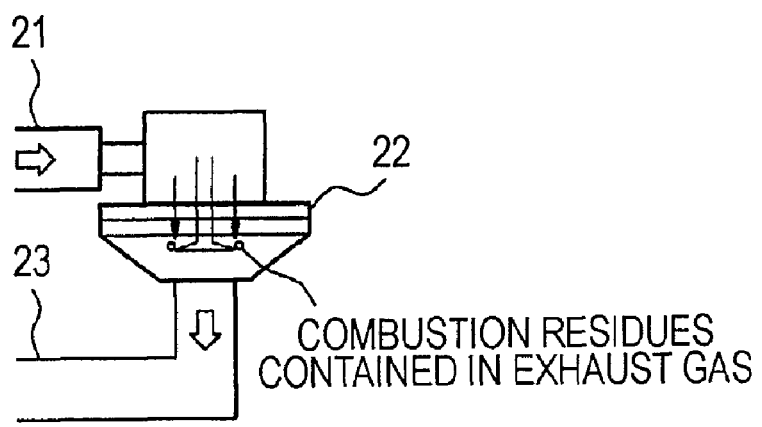
FIG. 3 is a detailed view of a secondary-air valve.

Therefore, while the air pump 12 is off and the secondary-air valves 22 are closed during normal operation, exhaust gas flows back in the secondary-air passages (via secondary-air discharging ports 11, secondary-air galleries 10, and pipes 23) during high-load operation in which the flow rate of exhaust gas is high, and the secondary-air valves 22 are exposed to high-temperature and high-pressure exhaust gas. For this reason, as shown in FIG. 3, combustion residues or the like contained in the exhaust gas adhere to valve portions of the secondary-air valves 22. This may cause sticking, or thermal degradation in a high-temperature atmosphere.

In order to solve these problems, in the present invention, the secondary-air valves 22 are opened so that secondary air can flow from the secondary-air supply source (e.g. air pump 12) after a warm-up of the engine under a predetermined high-load operating condition where the flow rate of the exhaust gas is more than a predetermined value.

Figure 4:
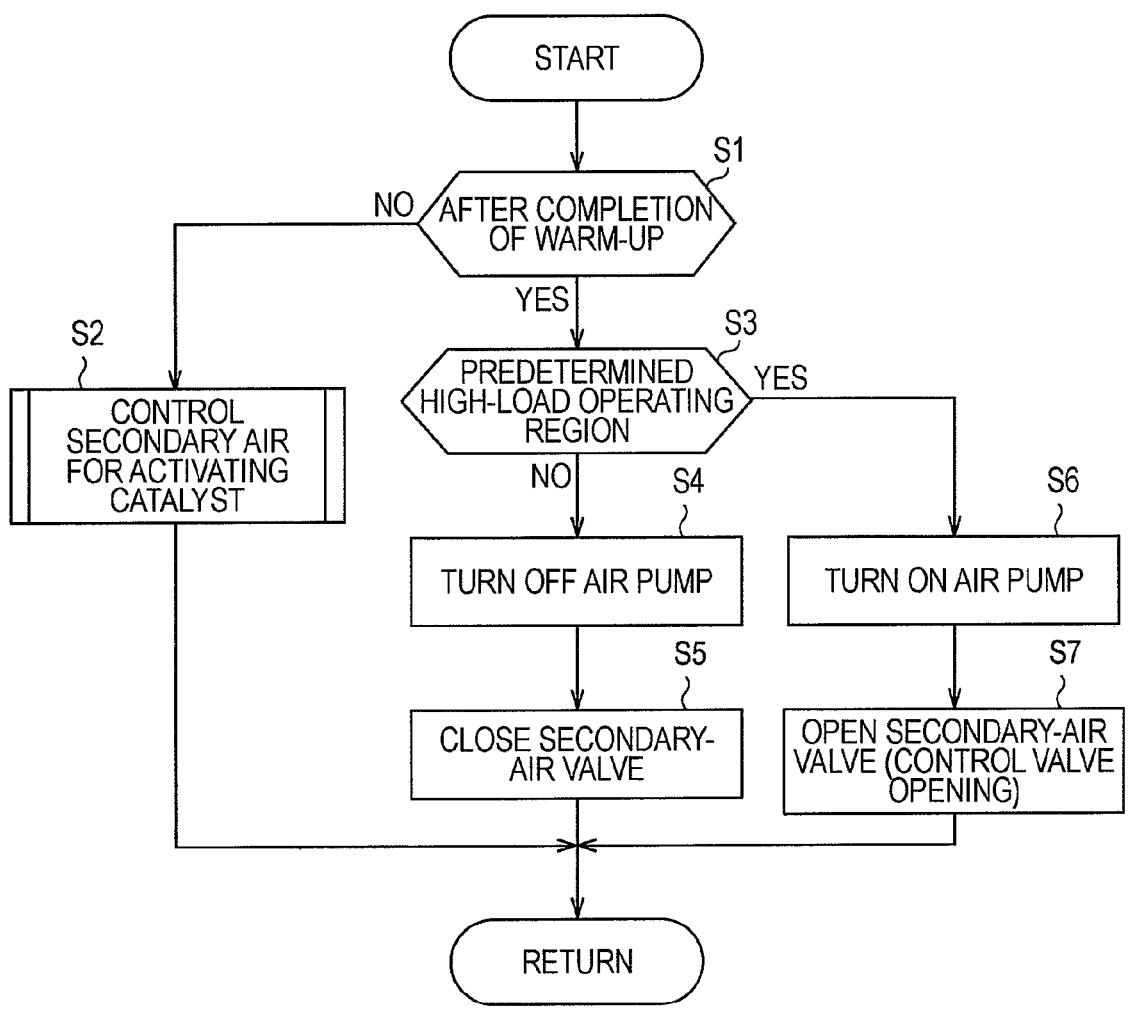
FIG. 4 is a flowchart showing a secondary-air control procedure.

FIG. 4 is a flowchart showing a secondary-air control procedure according to an embodiment of the invention.

In Step S1, it is determined, for example, on the basis of the catalyst temperature, whether a warm-up (activation of catalyst) has been completed.

When a warm-up has not been completed (catalyst has not been activated), in Step S2, secondary-air control for catalyst activation is carried out under a predetermined warm-up condition. This control has been described above.

Figure 5:
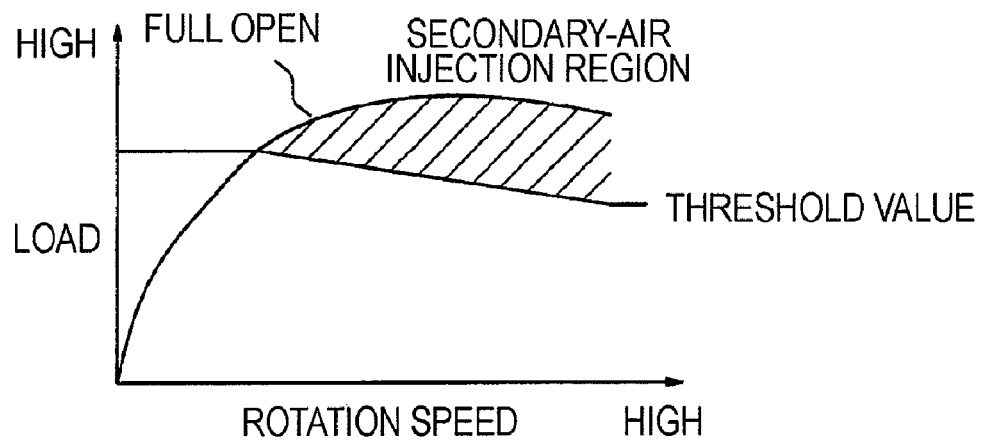
FIG. 5 is an explanatory view of a secondary-air injection region.

When a warm-up has been completed (catalyst has been activated), it is determined in Step S3 whether the operation is in a predetermined high-load operating region where the flow rate of exhaust gas is high. In other words, the engine speed and load are read, and it is determined whether the operation is in a secondary-air injection region (high-speed and high-load region) hatched in FIG. 5. More specifically, it is determined whether the load is more than or equal to a threshold value. The threshold value is set in accordance with the engine speed. The higher the engine speed is, the smaller the threshold value is. This is because the flow rate of exhaust gas increases as the engine speed increases even when the load is fixed.

When it is determined that the operation is not in the predetermined high-load operating region, the air pump 12 is turned off in Step S4, and the secondary-air valves 22 are kept completely closed in Step S5.

When the operation is in the high-load operating region, the air pump 12 is turned on in Step S6, and the secondary-air valves 22 are opened in Step S7 so that secondary air can flow.

Figure 6:
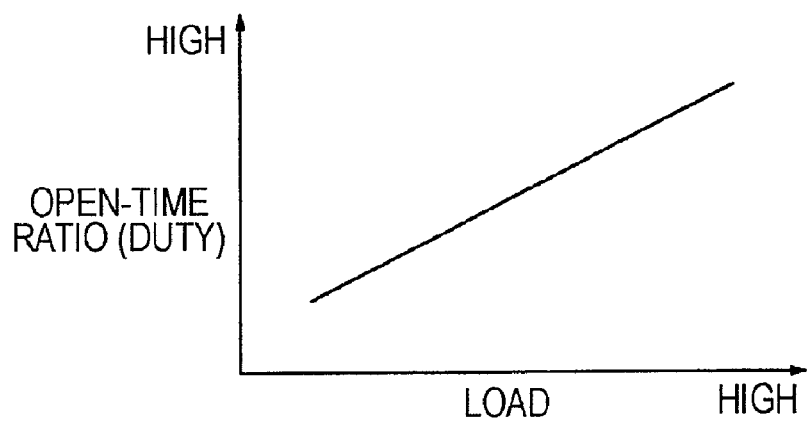
FIG. 6 is an explanatory view showing the control of the secondary-air flow rate.

The secondary-air valves 22 are subjected to duty control in accordance with the load, as shown in FIG. 6. In other words, the secondary-air valves 22 are repeatedly turned on and off at a predetermined cycle (about 100 ms) so as to intermittently supply secondary air. The duty (on-time ratio, open-time ratio) is controlled in accordance with the load. The higher the load is, the higher the duty is.

Thus, as the load increases, the substantial opening can be increased to increase the flow rate of secondary air. In this case, control can be performed in accordance with the rotation speed, instead of the load, so that the flow rate of secondary air increases as the rotation speed increases.

According to this embodiment, the internal combustion engine includes the secondary-air valves 22 provided in the secondary-air passages from the secondary-air supply source (air pump 12) to the upstream side of the catalyst in the exhaust passages. The secondary-air valves 22 are opened to supply secondary air under the predetermined warm-up condition. The secondary-air valves 22 are also opened so that secondary air can flow under the high-load operating condition where the flow rate of exhaust gas is high. Consequently, exhaust gas that would otherwise flow back to the secondary-air valves 22 is pushed back, and combustion residues or the like contained in the exhaust gas are prevented from reaching the valve portions. This can prevent the combustion residues from adhering to the secondary-air valves 22 as shown in FIG. 3. Alternatively, the combustion residues adhering to the valve portions can be removed by more positively blowing secondary air. Therefore, it is possible to prevent sticking of the secondary-air valves 22.

By cooling the secondary-air valves 22 with the flow (blow) of secondary air, the heat environment condition is eased and thermal degradation is avoided.

Further, since the heat environment condition can be eased, the structure of the secondary-air valves 22 can be simplified.

In the past, the secondary-air valve has sometimes been divided into two sections so that one section exposed to exhaust gas is formed of iron having a high heat resistance and the other section (air side) is formed of aluminum. However, since the secondary-air valves 22 of this embodiment can be integrally formed of aluminum because of cooling with secondary air, the cost can be reduced.

Further, while the secondary-air valve has been cooled by cooling water, this cooling is unnecessary. However, the cooling effect can be increased by performing cooling with cooling water and cooling with secondary air in combination.

This control can be carried out with the existing system without adding new sensors and devices. Therefore, the cost is not increased.

Since the air pump 12 for secondary-air supply is used under the warm-up condition, the capacity thereof is small. Further, secondary air is injected to protect the secondary-air valves 22 in a high-load operating region where the flow rate of exhaust gas is high. Therefore, even when the air pump 12 is fully driven, the ratio of injected secondary air to the exhaust gas is low. Since it is satisfactory as long as exhaust gas can be prevented from flowing back to the secondary-air valves 22 by injecting the secondary air, the required amount of secondary air is small. Therefore, the supply of secondary air has little negative effect (little fear that the exhaust gas temperature will excessively increase during high-load operation).

According to this embodiment, under the predetermined high-load operating condition, the engine load is more than or equal to the predetermined threshold value, and the threshold value is set to decrease as the engine speed increases. Therefore, the region where the flow rate of exhaust gas is more than or equal to the predetermined value can be reliably detected from the engine speed and load, and secondary air can be reliably supplied in this region.

Further, since the flow rate of secondary air is controlled in accordance with the engine load under the predetermined high-load operating condition, efficient cooling can be performed by increasing the flow rate of secondary air as the load increases.

In addition, the flow rate of secondary air is controlled by periodically opening and closing the secondary-air valves 22 and controlling the ratio of the open time and the close time. This allows the flow rate of secondary air to be easily controlled (duty control).

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A secondary-air supply system for an internal combustion engine, comprising:
   a catalyst provided in an exhaust passage and configured to purify exhaust gas from the engine;
   a secondary-air supply source and a secondary-air valve provided in a secondary-air passage connected upstream from the catalyst;
   a secondary-air supply device configured to drive the secondary-air supply source and to open the secondary-air valve to supply secondary air to the exhaust passage upstream from the catalyst; and
   a secondary-air supply controller configured to control the secondary-air supply device to drive the secondary-air supply source and to open the secondary-air valve under a warm-up condition of the engine and under a high-load operating condition having a high flow rate of the exhaust gas, the high-load operating condition being different from the warm-up condition;
   wherein the secondary-air supply source is configured to provide an amount of air sufficiently large to avoid sticking of the secondary-air valve but sufficiently small to have a negligible effect on the exhaust gas temperature under a high load operating condition.

2. The secondary-air supply system for an internal combustion engine according to claim 1, wherein the high-load operating condition is characterized by an engine load of more than or equal to a predetermined threshold value, and the threshold value is set to decrease as a rotation speed of the engine increases.

3. The secondary-air supply system for an internal combustion engine according to claim 1, wherein the secondary-air supply controller controls a flow rate of the secondary air in accordance with a load of the engine under the high-load operating condition.

4. The secondary-air supply system for an internal combustion engine according to claim 3, wherein the secondary-air supply controller controls the flow rate of the secondary air by periodically opening and closing the secondary-air valve so as to control a ratio of an open time and a close time.

5. A method of supplying secondary air with a secondary-air supply system for an internal combustion engine, the secondary-air supply system including a catalyst provided in an exhaust passage configured to purify exhaust gas from the engine, a secondary-air supply source and a secondary-air valve provided in a secondary-air passage connected upstream from the catalyst, a secondary-air supply device, and a secondary-air supply controller, the method comprising:
   driving the secondary-air supply source and opening the secondary-air valve with the secondary-air supply device to supply secondary air to the exhaust passage upstream from the catalyst under a warm-up condition of the engine;
   controlling the secondary-air supply device with a secondary-air supply controller to drive the secondary-air supply source and to open the secondary-air valve under a high-load operating condition having a high flow rate of the exhaust gas, the high-load operating condition being different from the warm-up condition;
   wherein the secondary-air supply source is controlled to provide an amount of air sufficiently large to avoid sticking of the secondary-air valve but sufficiently small to have a negligible effect on the exhaust gas temperature under a high load operating condition.

6. The method according to claim 1, wherein the high-load operating condition is characterized by an engine load more than or equal to a predetermined threshold value, and the threshold value is set to decrease as a rotation speed of the engine increases.

7. The method according to claim 5, further comprising controlling a flow rate of the secondary air with the secondary-air supply controller in accordance with a load of the engine under the high-load operating condition.

8. The method according to claim 7, comprising controlling the flow rate of the secondary air with the secondary-air supply controller by periodically opening and closing the secondary-air valve so as to control a ratio of an open time and a close time.

9. A secondary-air supply system for an internal combustion engine, comprising:

a catalyst provided in an exhaust passage and configured to purify exhaust gas from the engine;

a secondary-air supply source and a secondary-air valve provided in a secondary-air passage connected upstream from the catalyst;

a secondary-air supply device configured to drive the secondary-air supply source and to open the secondary-air valve to supply secondary air to the exhaust passage upstream from the catalyst; and secondary-air supply control means for controlling the secondary-air supply device to drive the secondary-air supply source and to open the secondary-air valve under a warm-up condition of the engine and under a high-load operating condition having a high flow rate of the exhaust gas, the high-load operating condition being different from the warm-up condition;

wherein the secondary-air supply source is configured to provide an amount of air sufficiently large to avoid sticking of the secondary-air valve but sufficiently small to have a negligible effect on the exhaust gas temperature under a high load operating condition.

* * * * *